Figure 1:
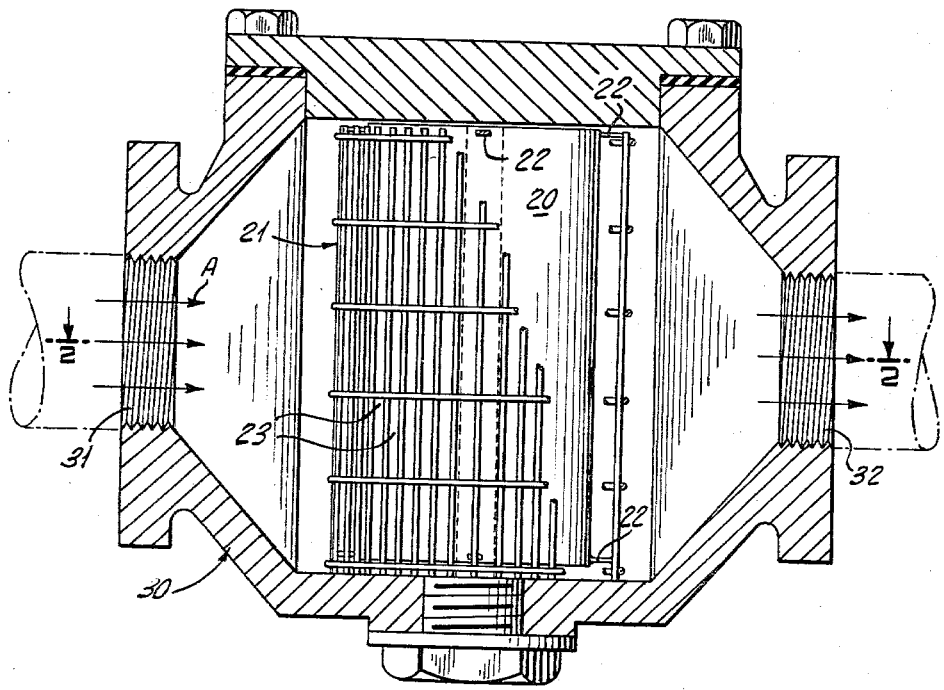

July 20, 1965

H. SOMMERMEYER 3,195,728

MAGNETIC FLUID FILTER

Filed April 7, 1961

INVENTOR
HEINRICH SOMMERMEYER

United States Patent Office 3,195,728
Patented July 20, 1965

3,195,728
MAGNETIC FLUID FILTER
Heinrich Sommermeyer, Ronneburgerstrasse 13,
Gera, Germany
Filed Apr. 7, 1961, Ser. No. 101,552
Claims priority, application Germany, Apr. 25, 1960,
S 68,221
1 Claim. (Cl. 210—223)

The present invention relates to a magnetic fluid filter and fluid flow divider associated with said filter to separate particles from a fluid stream, such as oil.

In my copending patent application Serial No. 837,876 (now abandoned) a filter is shown comprising a combination of a magnetic system of any desired shape with an enclosure or cover which mechanically retains the filtered particles. The stream of fluid is directed onto the active surface of this system and does not penetrate therethrough but passes along this particle-retaining magnetic surface.

According to the present invention, a magnetic fluid filter is arranged to provide a desired flow pattern of the fluid stream containing the particles as it approaches the filter. The efficiency of the filter is increased by directing the stream to be filtered towards the magnetic body in a wide stream.

According to the invention a flow divider shaped as a sieve or having slots or the like is arranged within the filter at a distance from the magnetic system. The openings of the flow divider may be round, square, rectangular, or have slots extending in any direction or they may be shaped as nozzles.

In one form, the flow divider may be magnetized by external means. Alternatively, in another form, non-magnetic material may be used for the flow divider.

In the case of a through filter, the flow divider may advantageously be shaped as a cylinder. In the case of automatic filters, the flow divider is preferably arranged at the entrance side, immediately preceding the magnetic system. The flow divider may be independent of, or part of, the cover material or enclosure which retains the particles mechanically.

The magnetic filter and flow divider separates the initial flow into partial or sub-divided streams of the medium to be filtered, which are directed approximately at right angles or radially relative to the magnetic system. These partial current streams intensively and directly contact all or at least most of the magnetic surface. The velocity of the partial currents may be made higher than the velocity of the initial current, by the structure of the flow divider.

These effects, and possibly some other effects, contribute to increase the filtering efficiency of the filter shown in my copending patent application Serial No. 837,876 (now abandoned). It is one of the advantages of the filter disclosed in my copending patent application that in a closed system the cross-sections of the flow remains constant. This advantage is retained for flow dividers having wide meshes and spaced from the walls of the housing. Thus an approximately constant flow resistance is assured.

It is an object of the present invention to provide a magnetic filter having therein a flow divider which evenly separates a main flow of a medium with entrained particles into a large number of partial or sub-divided flows.

It is an object of the present invention to provide such a flow divider to direct the partial flows in a desired direction and distribution onto the magnetic system of a filter such as a filter of the type disclosed in my copending patent application Serial No. 837,876 (now abandoned).

It is an object of the present invention to provide a current divider to increase the efficiency of a filter in removing particulate material from a stream of fluid.

Figure 2:
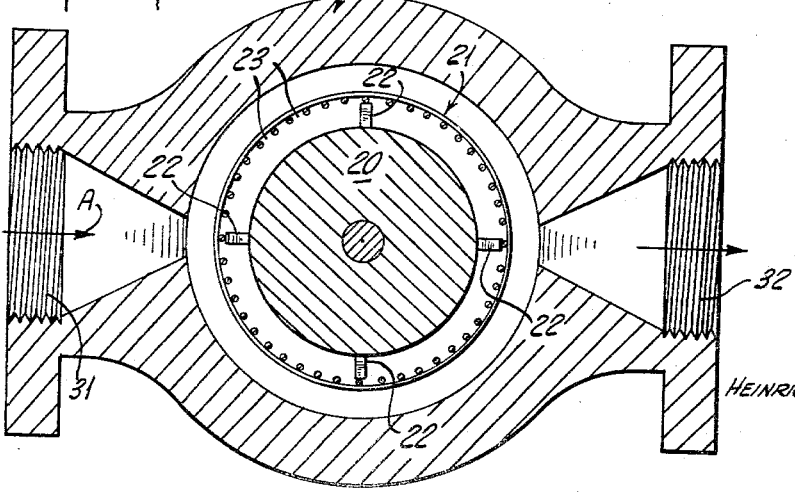

Further objects and advantages will become apparent from the following specification and the appended drawings in which:

FIG. 1 is a vertical sectional view of a cylindrical magnetic filter with a flow divider according to the present invention; and FIG. 2 is a horizontal sectional view of the filter shown in FIG. 1, taken along line 2—2 thereof.

Referring to the drawings, a cylindrical round or profiled magnetic system 20 is concentrically surrounded by a cage-shaped flow divider 21. The flow divider 21 is connected to the magnetic system 20 by magnetic pole shoes 22, and thus is magnetized. Openings 23 of the flow divider 21 may have any shape, for instance as slots as shown, or as perforations of other selected shape.

The medium to be purified enters preferably through a port 31 in the housing 30 of the filter perpendicular to the axis of the magnet 20 as indicated by the arrows A. The flow divider 21 separates this initial stream flow into a large number of partial currents corresponding to the slots or openings 23 in the flow divider 21, and the partial currents are directed substantially normal to the magnet 20. These partial currents impinge immediately against a large area of the magnetic system 20 and there depose their entrained impurities.

The purified medium also leaves the filter substantially radially relative to the magnetic system 20 and passes through the flow divider 21 into the housing 30 of the filter. The flow divider 21 does not impede the exit of the purified medium through an exit port 32. Thus deposits at the exit side of the magnetic system 20 occur only after the entrance side has been saturated.

The diameter of the flow divider 21 is preferably somewhat smaller than the inner diameter of the housing. Thus a valve is saved and the flow cross-section iincreased. For special filtering problems the flow divider 21 may be closely fitted into the housing. Also, the flow divider may be shaped as a half-cylinder and arranged at the entrance side of the magnetic system 20. These variants have not been illustrated.

Any cross-section of the flow divider is within the scope of the present invention. The cross-section may or may not correspond to that of the magnetic system.

If the flow divider is made of a woven mesh material, either the warp or woof may be of magnetic or non-magnetic material, to provide magnetic properties, as desired.

It should be understood that the foregoing disclosure relates to a preferred embodiment of the present invention, and that it is intended to cover all changes and modifications of the examples described which do not constitute departures from the spirit and scope of the invention as defined in the appended claim.

What is claimed is:

A magnetic filter for fluids, comprising a housing, inlet means opening into only one side of said housing, outlet means disposed diametrically opposite said inlet means on said housing, a cylindrical magnet spaced in a direct path between said inlet and said outlet means within said housing, and a flow dividing screen member comprising a cylindrical grid of wires having axially elongated openings coextensive with the cylindrical surface of said magnet for dividing the input flow to said filter into a large number of streams flowing within the field of said magnet, the axis of said screen member being substantially transverse to the flow of liquid through said inlet and said outlet means, and said screen being spaced between said magnet and said housing to form a flow channel from said inlet to said outlet means, at least a portion of said channel comprising the space between said screen member and said housing, so that if said screen member becomes clogged, fluid flows through said filter between said inlet and said outlet means without a substantial pressure drop across said filter.

References Cited by the Examiner

UNITED STATES PATENTS

| 2,800,230 | 7/57 | Thoma | 210—223 |
| 2,939,583 | 6/60 | Hett | 210—223 |

FOREIGN PATENTS

| 869,210 | 5/61 | Great Britain. |
| 609,814 | 10/60 | Italy. |

REUBEN FRIEDMAN, *Primary Examiner.*

HARRY B. THORNTON, HERBERT L. MARTIN,
*Examiners.*